United States Patent [19]
Phommarath

[11] Patent Number: 5,525,892
[45] Date of Patent: Jun. 11, 1996

[54] PULSED BATTERY REJUVENATOR HAVING VARIABLE TRAILING EDGE SHAPED PULSES

[75] Inventor: Southiphone T. Phommarath, Mesquite, Tex.

[73] Assignee: Pulse Charge Systems, Inc., Rockwall, Tex.

[21] Appl. No.: 110,991

[22] Filed: Aug. 24, 1993

[51] Int. Cl.$^6$ ................................................ H01M 10/46
[52] U.S. Cl. ................................................ 320/20; 320/21
[58] Field of Search ................................. 320/20, 5, 21, 320/22, 48, 31, 37, 49; 363/131, 132

[56] References Cited

U.S. PATENT DOCUMENTS

| | | | |
|---|---|---|---|
| 2,503,179 | 4/1950 | Tichenor | 320/14 |
| 3,252,070 | 5/1966 | Medlar et al. | 320/21 |
| 3,487,284 | 12/1969 | Cady | 320/20 |
| 3,556,849 | 1/1971 | Oswin et al. | 136/30 |
| 3,563,800 | 2/1971 | Oswin et al. | 136/30 |
| 3,576,487 | 4/1971 | Chase | 320/39 |
| 3,594,627 | 7/1971 | Lesher | 320/21 |
| 3,629,681 | 12/1971 | Gurwicz | 320/21 |
| 3,761,795 | 9/1973 | Clayton et al. | 320/20 |
| 3,816,807 | 6/1974 | Taylor | 320/20 |
| 3,839,089 | 10/1974 | Duddy | 136/26 |
| 3,921,050 | 11/1975 | Rowas | 320/19 |
| 3,963,976 | 6/1976 | Clark | 320/21 |
| 4,016,474 | 4/1977 | Mason | 320/15 |
| 4,213,080 | 7/1980 | Rock | 320/21 |
| 4,274,044 | 6/1981 | Barre | 320/21 |
| 4,390,940 | 6/1983 | Corbefin et al. | 363/132 |
| 4,626,983 | 12/1986 | Harada et al. | 363/132 |
| 4,644,256 | 2/1987 | Farias et al. | 323/299 |
| 4,695,935 | 9/1987 | Oen et al. | 363/21 |
| 4,736,150 | 4/1988 | Wagner | 320/21 |
| 4,740,739 | 4/1988 | Quammen et al. | 320/14 |
| 4,786,851 | 11/1988 | Fuji et al. | 320/2 |
| 4,795,537 | 1/1989 | Timewell | 204/129 |
| 4,871,959 | 10/1989 | Gali | 320/61 |
| 4,878,007 | 10/1989 | Gabor et al. | 320/14 |
| 4,931,367 | 6/1990 | Brecht et al. | 320/4 X |
| 5,027,051 | 6/1991 | Lafferty | 323/222 |
| 5,043,650 | 8/1991 | Bhagwat et al. | 320/39 |
| 5,045,769 | 9/1991 | Everett, Jr. | 320/2 |
| 5,063,341 | 11/1991 | Gali | 320/21 |
| 5,140,250 | 8/1992 | Morland | 320/13 |
| 5,250,904 | 10/1993 | Salander et al. | 320/48 X |
| 5,256,957 | 10/1993 | Wiesspeiner | 320/20 |

FOREIGN PATENT DOCUMENTS

| | | | |
|---|---|---|---|
| 2227147 | 4/1973 | France . | |
| 1943681 | 3/1971 | Germany | 320/61 X |
| 2506828 | 8/1975 | Germany . | |
| 2557010 | 6/1977 | Germany . | |
| 311830 | 12/1989 | Japan . | |
| 639053 | 4/1973 | U.S.S.R. . | |
| 892577 | 10/1979 | U.S.S.R. . | |
| 1578922 | 10/1979 | United Kingdom . | |
| 0889306 | 10/1979 | United Kingdom . | |
| 2085244 | 9/1980 | United Kingdom . | |
| WO9207404 | 4/1992 | WIPO . | |

OTHER PUBLICATIONS

D. J. Chamund, et al., "High Frequency Battery Charger Uses Thyristors," Electrical Times, Dec. 14, 1979.
T. Palanisamy, "Charging Techniques for a Universal Lead–Acid Battery Charger," IEEE Proceedings of the 34th International Power Sources Symposium, Jun. 25–28, 1990.

*Primary Examiner*—Peter S. Wong
*Assistant Examiner*—Edward Tso
*Attorney, Agent, or Firm*—Harold E. Meier

[57] ABSTRACT

A battery rejuvenator circuit for use in conjunction with automatic start/stop battery generators. The rejuvenator circuit generates a positive voltage pulse train (characterized by a fast rise time spike followed by a non-uniform hump-shaped trail-off) that is combined with a DC charging current output by the charger. Operation of the rejuvenator circuit is controlled by a start-up delay circuit and a disconnect circuit. The start-up delay circuit senses the connection to a battery and delays for a predetermined time period to allow charging to begin before activating the rejuvenation circuit. The disconnect circuit senses the disconnection of the charger from the battery and deactivates the rejuvenation circuit.

10 Claims, 2 Drawing Sheets

PULSED BATTERY REJUVENATOR HAVING VARIABLE TRAILING EDGE SHAPED PULSES

TECHNICAL FIELD

The present invention relates to battery rejuvenators and, in particular, to a pulsed battery rejuvenator including a start-up delay and disconnect circuit.

BACKGROUND OF THE INVENTION

A characteristic of lead acid batteries is that sulfate crystals tend to adhere to, and build up on the battery plates as a result of battery discharge. The deposit of sulfate crystals on the battery plates tends to eventually choke the battery by interfering with or blocking the movement of the electrolytes necessary for generating electric current during discharge. Replacement of individual cells, and often the entire battery, has been and continues to be the most widely used treatment for severe cases of sulfate deposits. Another solution is the application of high currents to the battery (fast charging). However, such fast charging techniques have been known to warp the battery plates and further damage the battery.

In response to the foregoing sulfate deposit problems and the lack of a safe and effective method for reducing or removing sulfate build-up, U.S. Pat. No. 5,063,341, issued Nov. 5, 1991 to Carl E. Gali, discloses a circuit that generates a positive voltage pulse train comprised of a plurality of pulses having a substantially uniform pulse width, rise time and peak voltage. The application of such fast rise time, short duration pulses in a pulse train to a deteriorated, sulfated battery has been found to substantially remove sulfate deposits from the battery plates. In spite of the benefits provided by the Gali rejuvenator, improved sulfate deposit removal and circuit operation is desired.

SUMMARY OF THE INVENTION

The present invention comprises a modification of the pulse generating, battery rejuvenating circuit disclosed in U.S. Pat. No. 5,063,341, issued Nov. 5, 1991 to Carl E. Gali. The battery rejuvenator circuit of the present invention includes a saturated transistor oscillator circuit that generates a pulsed output waveform, each pulse therein characterized by a fast rise time spike followed by a hump-shaped trail-off. Furthermore, the shape of the trail-off of each pulse is not uniform from pulse to pulse in the pulse train. This fluctuation in the shape characteristics of the pulses within the pulse train is believed to result in improved sulfate deposit removal.

The battery rejuvenator circuit of the present invention further includes a start-up delay and disconnect circuit for controlling the operation of a battery rejuvenating circuit. The start-up delay battery circuit senses DC battery current output when the rejuvenator is connected to a battery and delays for a predetermined time period before activating the rejuvenation circuit. The disconnect circuit senses the disconnection of the rejuvenator from the battery and deactivates the rejuvenation circuit.

BRIEF DESCRIPTION OF THE DRAWINGS

A more complete understanding of the pulsed battery rejuvenator of the present invention may be had by reference to the following Detailed Description when taken in conjunction with the accompanying Drawings wherein.

DETAILED DESCRIPTION OF THE DRAWINGS

Figure 1:
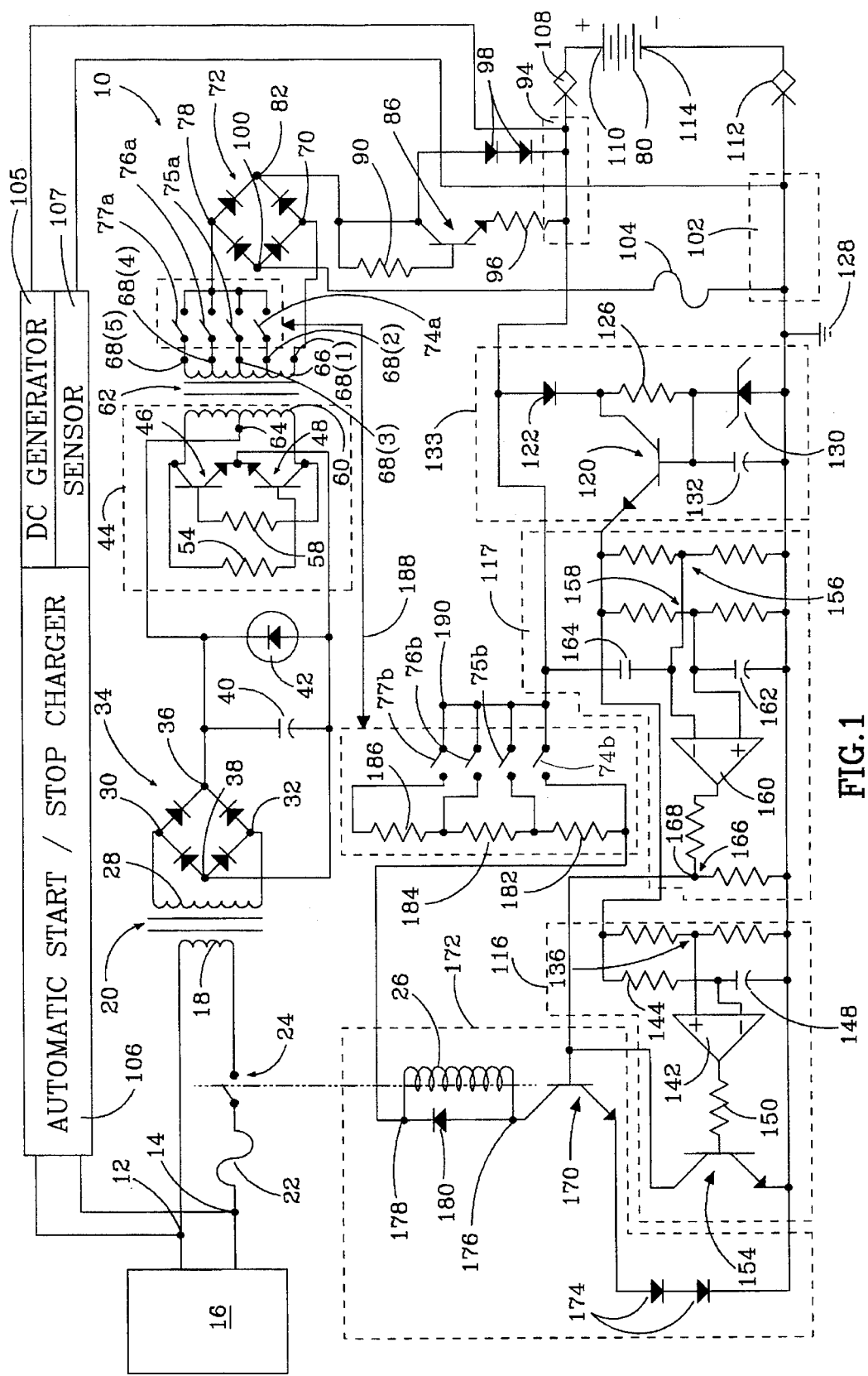
FIG. 1 is a schematic illustration of the circuit for the pulsed battery rejuvenator of the present invention.

Referring now to FIG. 1, there is shown a schematic illustration of the circuit for the pulsed battery rejuvenator 10 of the present invention. The pulsed battery rejuvenator 10 receives operating power at inputs 12 and 14 from an alternating current (AC) power source 16 that may comprise, for example, the alternator of an automobile or other vehicle, or a standard AC utility line. It will, of course, be understood that other types of AC power sources 16 may be used to power the pulsed battery rejuvenator 10, or that the AC power source 16 and AC-to-DC conversion circuit elements to be described herein may be deleted from the circuit if a DC power source of appropriate voltage is available.

The first input 12 is connected to one end of a primary coil 18 for a step-down transformer 20. The other end of the primary coil 18 is connected to the second input 14 through a fuse 22 and a switch 24, wherein the switch is actuated by a relay coil 26 in a manner to be described. The step-down transformer 20 further includes a secondary coil 28. The turns ratio between the primary and secondary coils 18 and 28, respectively, is set such that the transformer 20 will convert the AC voltage supplied by the power source 16 at the primary to a twelve volt AC output at the secondary. The opposite ends of the secondary coil 28 of the step-down transformer 20 are connected to the input terminals 30 and 32 of a four diode, full wave rectifier bridge 34. The bridge 34 rectifies the twelve volt AC output from the secondary 28 of the transformer 20.

Connected in parallel between the output terminals 36 and 38 of the bridge 34 are a capacitor 40 and a light emitting diode (LED) 42. The capacitor 40 functions to filter the AC components from the rectified signal output from the secondary 28 of the transformer 20 to generate a twelve volt direct current (DC) power output. The capacitor 40 also functions as a part of the oscillation circuit to be described herein. The LED 42 emits light when the twelve volt DC output signal is generated by the transformer 20 and capacitor 40 indicating to the user that the switch 24 is closed and the pulsed battery rejuvenator 10 is in operation.

The output terminals 36 and 38 of the bridge 34 are further connected to an inverter multivibrator (oscillator) circuit 44. The inverter multivibrator circuit 44 includes two transistors 46 and 48 whose emitters are connected both to each other and to the output terminal 38 of the bridge 34. The collector of the first transistor 46 is connected through a resistor 54 to the base of the second transistor 48. Similarly, the collector of the second transistor 48 is connected through a resistor 58 to the base of the first transistor 46.

The collector of the first transistor 46 is further connected to one end of a primary coil 60 for a ferrite core, high frequency transformer 62. The other end of the primary coil 60 of the high frequency transformer 62 is connected to the collector of the second transistor 48. The primary coil 60 has forty-two turns and further includes a center tap 64 (at twenty-one turns) that is connected to the output terminal 36 of the bridge 34. During operation, the transistors 46 and 48 are placed into saturation and alternatively switch on and off at a frequency determined by the values of the resistors 54 and 58, the capacitance of the capacitor 40 and the inductance of the primary coil 60. The inverter multivibrator circuit 44 thus responds to the application of the twelve volt DC power signal supplied from the bridge 34 by oscillating to generate a pulse train comprised of alternating positive and negative pulses.

The secondary coil 66 of the high frequency transformer 62 includes eighty-two turns and a plurality of taps 68 (at one, twenty-eight, forty-six, sixty-four and eighty-two turns). The number of turns on the secondary coil 66 determines the peak output voltage of the rejuvenation signal generated by the rejuvenator 10. The first tap 68(1) is connected to one input terminal 70 of a four diode, full wave rectifier bridge 72. The bridge 72 functions to convert the negative pulses generated by the inverter multivibrator circuit 44 into positive pulses to output from the bridge a pulse train comprised of positive pulses. The rectification thus doubles the frequency of the output pulse train.

The remaining taps 68(2) through 68(5) of the secondary coil 66 of the transformer 62 are connected through individual, corresponding jumpers 74a–77a to the other input terminal 78 of the bridge 72. Selection and closure of one of the jumpers 74a–77a changes the number of turns utilized on the secondary coil 66, and thus changes the peak voltage of the pulsed signal output from the transformer 62. Closure of one of the jumpers 74a–77a is made (preferably at the factory) in accordance with the number of cells (rated voltage) present in the battery 80 intended to be rejuvenated by the rejuvenator 10. For example, closure of the jumper 74a accesses twenty-eight turns on the secondary coil 66 and is chosen for rejuvenating a battery 80 with six cells (a twelve volt battery), while selection of the jumper 77a accesses eighty-two turns and is chosen for rejuvenating a battery with 24 cells (a forty-eight volt battery).

The output terminal 82 of the bridge 72 is connected to the collector of a transistor 86, and is further connected to the base of the transistor 86 through a resistor 90. The emitter of the transistor 86 is connected to a positive output terminal 94 for the pulsed battery rejuvenator 10 through a resistor 96. The collector of the transistor 86 is also connected to the positive output terminal 94 through a pair of serially connected diodes 98. The other output terminal 100 of the bridge 72 is connected to a negative output terminal 102 through a fuse 104.

Figure 2:
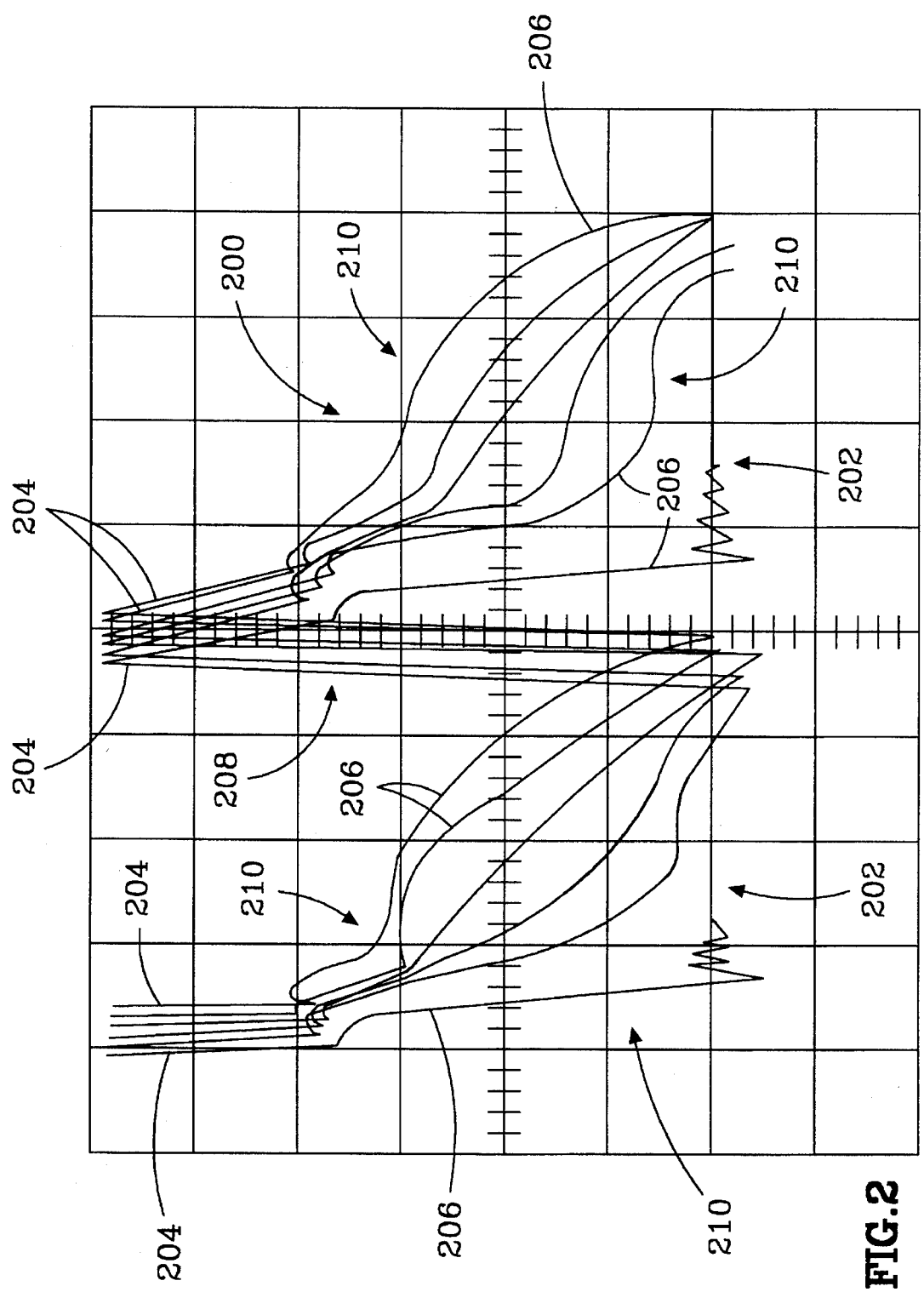
FIG. 2 shows an example of the loaded output waveform for the positive voltage pulsed rejuvenation signal generated by the pulsed battery rejuvenator of FIG. 1.

Referring now to FIG. 2, there is shown an example of the loaded waveform 200 generated and output by the pulsed battery rejuvenator 10 of the present invention as viewed on an oscilloscope. Each horizontal division in FIG. 2 represents twenty microseconds. Each vertical division in FIG. 2 represents fifty millivolts, with the center horizontal line equal to the voltage (V) of the battery 80 being rejuvenated.

The waveform 200 comprises a train of individual pulses 202 (two shown in FIG. 2), each pulse generally characterized by a fast rise time spike portion 204 followed immediately by a hump shaped trail-off portion 206. The rise time 208 for the spike portions 204 of the pulses 202 generated by the pulsed battery rejuvenator 10 is approximately four to eight microseconds per pulse. Furthermore, as generally indicated at 210, the shape of the trail-off portions 206 of the pulses 202 generated by the pulsed battery rejuvenator 10 in the pulse train is not uniform.

Although only six different variations for each pulse 202 generated by the pulsed battery rejuvenator 10 are shown in FIG. 2, it will, of course, be understood that FIG. 2 illustrates only the pulse shapes that appear most frequently on the oscilloscope in the example pulse train. Pulses having other similar shapes, each characterized by a spike portion 204 followed by a hump-shaped trail-off portion 206 (wherein there is a fluctuation in trail-off hump shape), are barely visible on the oscilloscope between the illustrated pulses, but have not been shown in FIG. 2 for reasons of clarity. Applicant believes that the waveform generated by the pulsed battery rejuvenator 10 provides for enhanced performance in removing sulfate deposits from battery plates in comparison to the uniform pulse waveform generated by the Gali pulsed battery rejuvenator disclosed in U.S. Pat. No. 5,063,341.

Returning now to FIG. 1, the pulsed battery rejuvenator 10 may be used in conjunction with a battery charger 106 (preferably an automatic start/stop type charger) that may also receive power from the power source 16. The charger 106 outputs a DC charging current applied to the battery 80 through the positive output terminal 94 by means of a first clip 108 connected to the positive battery terminal 110, and through the negative output terminal 102 by means of a second clip 112 connected to the negative battery terminal 114.

The charger 106 includes a DC charging current generator 105, and a battery sensor 107. The sensor 107 monitors the charged state of the battery and in response thereto, controls the generation of the charging current. When the monitored charge for the battery 80 falls below a predetermined level, the generator 105 is automatically actuated to charge the battery. Conversely, if the monitored charge exceeds another predetermined level, the actuation of the generator 105 is automatically terminated.

The pulsed battery rejuvenator 10 further includes a start-up delay circuit 116 and a disconnect circuit 117 for controlling the actuation of the switch 24 through which power is supplied to the pulsed battery rejuvenator.

The positive output terminal 94 is connected to the collector of a transistor 120 through a diode 122. The collector of the transistor 120 is further connected to its base through a resistor 126. The negative output terminal 102 is connected to ground 128, and also to the base of the transistor 120 through a zener diode 130 and capacitor 132 that are connected in parallel. The foregoing circuit elements comprise a power supply circuit 133 for the start-up delay circuit 116 and disconnect circuit 117. The circuit 133 outputs a DC voltage substantially equal to the rated voltage of the zener diode 130 in response to the application of power from the battery 80 at terminal 94.

The emitter of the transistor 120 in the power supply 133 will output a regulated DC voltage that is divided by a voltage divider 136 in the start-up delay circuit 116 and applied to the positive terminal of an operational amplifier 142 configured as a comparator. The emitter 134 is further connected through a resistor 144 to the negative terminal of the operational amplifier 142, with the negative terminal further connected to ground 128 through a capacitor 148. The output of the operational amplifier 142 is connected through a resistor 150 to the base of a transistor 154 having a grounded emitter.

The emitter of the transistor 120 for the power supply 133 is further connected to a pair of voltage dividers 156 and 158 in the disconnect circuit 117 that divide and apply the regulated voltage to the positive and negative terminals of an operational amplifier 160 configured as a comparator. The positive terminal of the operational amplifier 160 is further connected to ground 128 through a capacitor 162. The negative terminal of the operational amplifier 160 is connected to the positive output terminal 94 through a capacitor 164. The output of the operational amplifier 160 is applied to a voltage divider 166 having a divider node 168.

The collector of the transistor 154 in the start-up delay circuit 116 and the divider node 168 in the disconnect circuit 117 are both connected to the base of a transistor 170 included in a relay control circuit 172. The emitter of the transistor 170 is connected to ground 128 through a pair of serially connected diodes 174. The collector of the transistor 170 is connected to one end 176 of the relay coil 26. The other end 178 of the relay coil 26 is connected to the collector of the transistor 170 through diode 180. The other end 178 of the relay coil 26 is further connected to jumper 74b, to jumper 75b through resistor 182, to jumper 76b through resistors 182 and 184, and to jumper 77b through resistors 182, 184 and 186. The jumpers 74a–77a (described above) and the jumpers 74b–77b are associated with each other, as generally indicated at 188, such that closure of a jumper having an "a" postscript also actuates the correspondingly numbered jumper having a "b" post-script. The opposite ends 190 of jumpers 74b through 77b are connected to the positive output terminal 94. Closure of a jumper 74b–77b, as previously described, is also made according to the rated voltage of the battery 80 to be charged.

The pulsed battery rejuvenator 10 will often be operated in conjunction with the automatic start/stop battery charger 106 having a well known design and an operation as previously described. When the first and second clips 108 and 112 are connected to the positive and negative terminals 110 and 114, respectively, of the battery 80, the sensor 107 of the charger 106 will sense the charged state of the battery and, if charging is needed, will generate a DC charging current via the generator 105 for delivery to the positive battery terminal 110.

A portion of the DC current output from the battery after the clips 108 and 112 are connected is sampled at the positive output terminal 94 and used by the power supply circuit 133 to generate the regulated DC voltage output from the emitter of the transistor 120. The regulated DC voltage then charges capacitor 148 of the start-up delay circuit 116. When the charge on capacitor 148 exceeds the voltage supplied by the voltage divider 136 to the operational amplifier, the output of the operational amplifier 142 switches and the amplifier applies a voltage sufficient to control the conductance between the collectors and emitters of transistors 154 and 170, with transistor 170 controlling actuation of the relay coil 26 to cause the closure of switch 24. The start-up delay circuit 116 thus allows charging of the battery 80 by the charger 106 (if necessary) to begin before the pulse signal for removing sulfate deposits is applied to the battery by the pulsed battery rejuvenator 10. In the preferred embodiment of the pulsed battery rejuvenator 10, the start-up delay circuit 116 delays application of the pulse signal to the battery for approximately ten to fifteen seconds after an initial connection to the battery and sensing of the DC battery output current. In instances where the battery is too discharged to generate an output current sufficient for actuating the delay circuit, the application of the DC charging current from charger 106 will also cause initiation of the delay timing.

With the closure of switch 24, power from the power supply 16 is supplied to transformer 20 and bridge 34 to generate a rectified signal. The AC components in the rectified signal output from the bridge 34 are filtered by the capacitor 40 to generate a DC signal. The DC signal is then applied to the inverter multivibrator circuit 44 which oscillates to generate a pulse train at the secondary coil 66 of transformer 62 comprised of alternating positive and negative pulses.

The peak voltage for the pulses in the pulse train needed for rejuvenating the battery 80 is chosen by the closure of one of the jumpers 74a–77a. The negative pulses in the pulse train are inverted by the bridge 72 to generate a positive voltage pulse train that is applied through transistor 86, positive output terminal 94, negative output terminal 102, and clips 108 and 112 (in conjunction with the DC charging current from the charger 106) to the battery 80. The voltage of each of the pulses is distributed across the plates of the battery 80 to substantially remove sulfate deposits from the battery plates of the battery while the DC charging current recharges the battery cells.

The sensor 107 of the automatic start/stop charger 106 further senses when the battery 80 has been sufficiently charged and, in response thereto, terminates the generation of the DC charging current for delivery to the positive battery terminal 110. Upon termination of the charging operation, the rejuvenator 10 will continue to apply pulses to the battery 80. However, when the clips 108 and 112 are disconnected from the battery 80, the generated positive voltage pulse train signal (now generated unloaded) is sampled at the positive output terminal 94 with the AC components passed through capacitor 164 to operational amplifier 160. In response to the difference in voltage resulting from the presence of the unloaded pulsed rejuvenation signal, the operational amplifier 160 outputs a voltage sufficient to control the conductance between the collector and emitter of transistor 170, and thus control the actuation of the relay coil 26 to cause the opening of switch 24 and the termination of the pulsed rejuvenation signal generation.

Although a preferred embodiment of the pulsed battery rejuvenator of the present invention has been illustrated in the accompanying Drawings and described in the foregoing Detailed Description, it will be understood that the invention is not limited to the embodiment disclosed but is capable of numerous modifications without departing from the scope of the invention.

I claim:

1. A battery rejuvenator, comprising:

means for generating a pulsed rejuvenation signal for application to a battery, each pulse of said pulsed rejuvenation signal having a fast leading edge rise time and having between subsequent pulses a varying shaped trailing edge portion;

means for connecting the means for generating to the battery;

means for sensing connectivity to the battery and generating a connection signal;

means responsive to the connection signal of the means for sensing for controlling actuation of the means for generating the pulsed rejuvenation signal.

2. The battery rejuvenator as in claim 1 wherein the means for controlling comprises means for delaying for a predetermined time period the actuation of the means for generating following an initial connection of the means for generating to the battery.

3. The battery rejuvenator as in claim 1 wherein the means for controlling comprises means for de-actuating the means for generating following a disconnection of the means for generating from the battery.

4. The battery rejuvenator as in claim 1 wherein the means for controlling comprises:

means for delaying for a predetermined time period the actuation of the means for generating following an initial connection of the means for generating to the battery; and means for de-actuating the means for generating following a disconnection of the means for generating from the battery.

5. The battery rejuvenator as in claim 4 wherein the means for generating comprises oscillation means for generating a positive voltage pulse train as the pulsed rejuvenation signal.

6. A battery rejuvenator for use in conjunction with a battery charger that generates a DC charging current applied to charge a battery, comprising:

means for generating a pulsed rejuvenation signal;

switch means for controlling the generation of the pulsed rejuvenation signal;

means for connecting the battery charger and the means for generating to the battery;

first means for sensing the application of the DC charging current to the battery by the battery charger;

second means for sensing the application of a DC discharge current output from the battery;

third means for sensing the disconnection of the means for connecting from the battery; and means for controlling the actuation of the switch means controlled generation of the pulsed rejuvenation signal, said means including: means responsive to the initial sensing of either the DC charging current or DC discharge current by the first or second means for sensing, respectively, for delaying actuation of the switch means for a predetermined time delay; and, means responsive to the sensing of the disconnection of the means for connecting from the battery by the third means for sensing for de-actuating the switch means.

7. The battery rejuvenator as in claim 6 wherein the means for generating comprises oscillation means for generating a positive voltage pulse train as the pulsed rejuvenation signal.

8. The battery rejuvenator as in claim 7 wherein the oscillation means comprises:

an inverter multivibrator circuit generating an output signal comprising a train of alternating positive and negative pulses;

switch means for setting the peak voltage of the alternating pulses; and a rectifier for transforming the negative pulses in the output signal into positive pulses to generate the positive voltage pulse train.

9. A battery rejuvenator, comprising:

oscillation means for generating a train of varying shaped positive voltage pulses, the pulse train having a predetermined frequency, said means including means for shaping each individual pulse in the form of a spike having a leading edge with a substantially fast rise time followed by a trailing edge having a varying shape between subsequent pulses; and connector means coupled to the oscillation means for connecting the positive voltage pulse train to a battery.

10. The rejuvenator as in claim 9 wherein the oscillation means comprises a transistor oscillator circuit, the means for shaping including means for placing each transistor of the transistor oscillator circuit into a saturated operating mode.

* * * * *